United States Patent
Fischer et al.

(10) Patent No.: US 8,170,308 B2
(45) Date of Patent: May 1, 2012

(54) ERROR ADAPTIVE FUNCTIONAL IMAGING

(75) Inventors: Alexander Fischer, Aachen (DE); Lothar Spies, Hamburg (DE); Carsten Meyer, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 754 days.

(21) Appl. No.: 12/300,341

(22) PCT Filed: May 1, 2007

(86) PCT No.: PCT/US2007/067848
§ 371 (c)(1),
(2), (4) Date: Nov. 11, 2008

(87) PCT Pub. No.: WO2007/136968
PCT Pub. Date: Nov. 29, 2007

(65) Prior Publication Data
US 2009/0208075 A1    Aug. 20, 2009

Related U.S. Application Data

(60) Provisional application No. 60/747,668, filed on May 19, 2006.

(51) Int. Cl.
*G06K 9/00* (2006.01)

(52) U.S. Cl. ........ 382/128; 382/129; 382/130; 382/131; 382/132; 382/173; 382/217; 382/218

(58) Field of Classification Search .......... 382/128–132, 382/217, 218, 199, 15, 173; 378/4–27; 128/922
See application file for complete search history.

(56) References Cited

U.S. PATENT DOCUMENTS

| | | | | |
|---|---|---|---|---|
| 5,926,568 | A * | 7/1999 | Chaney et al. | 382/217 |
| 6,138,045 | A * | 10/2000 | Kupinski et al. | 600/425 |
| 6,215,893 | B1 | 4/2001 | Leshem et al. | |
| 6,574,304 | B1 * | 6/2003 | Hsieh et al. | 378/62 |
| 6,611,615 | B1 * | 8/2003 | Christensen | 382/130 |
| 6,701,025 | B1 * | 3/2004 | Avinash | 382/261 |
| 6,947,590 | B2 * | 9/2005 | Magarey et al. | 382/164 |
| 7,349,563 | B2 * | 3/2008 | Kiraly et al. | 382/128 |
| 7,817,827 | B2 * | 10/2010 | Gal et al. | 382/128 |
| 2003/0128801 | A1 | 7/2003 | Eisenberg et al. | |
| 2003/0142857 | A1 * | 7/2003 | Alyassin | 382/131 |
| 2003/0225325 | A1 * | 12/2003 | Kagermeier et al. | 600/407 |
| 2004/0044715 | A1 * | 3/2004 | Aldroubi et al. | 708/490 |

(Continued)

FOREIGN PATENT DOCUMENTS

EP    0747731 A2    12/1996

(Continued)

OTHER PUBLICATIONS

Gari, G., et al.; A novel genetic algorithm for automatic clustering; 2004; Pattern Recognition Letters; 25:173-187.

(Continued)

*Primary Examiner* — Georgia Y Epps
*Assistant Examiner* — Sultan Chowdhury

(57) ABSTRACT

A method for use in functional medical imaging includes adaptively partitioning functional imaging data as a function of a spatially varying error model. The functional image data is partitioned according to an optimization strategy. The data may be visualized or used to plan a course of treatment. In one implementation, the image data is partitioned so as to vary its spatial resolution. In another, the number of clusters is varied based on the error model.

40 Claims, 2 Drawing Sheets

U.S. PATENT DOCUMENTS

Figure 1:
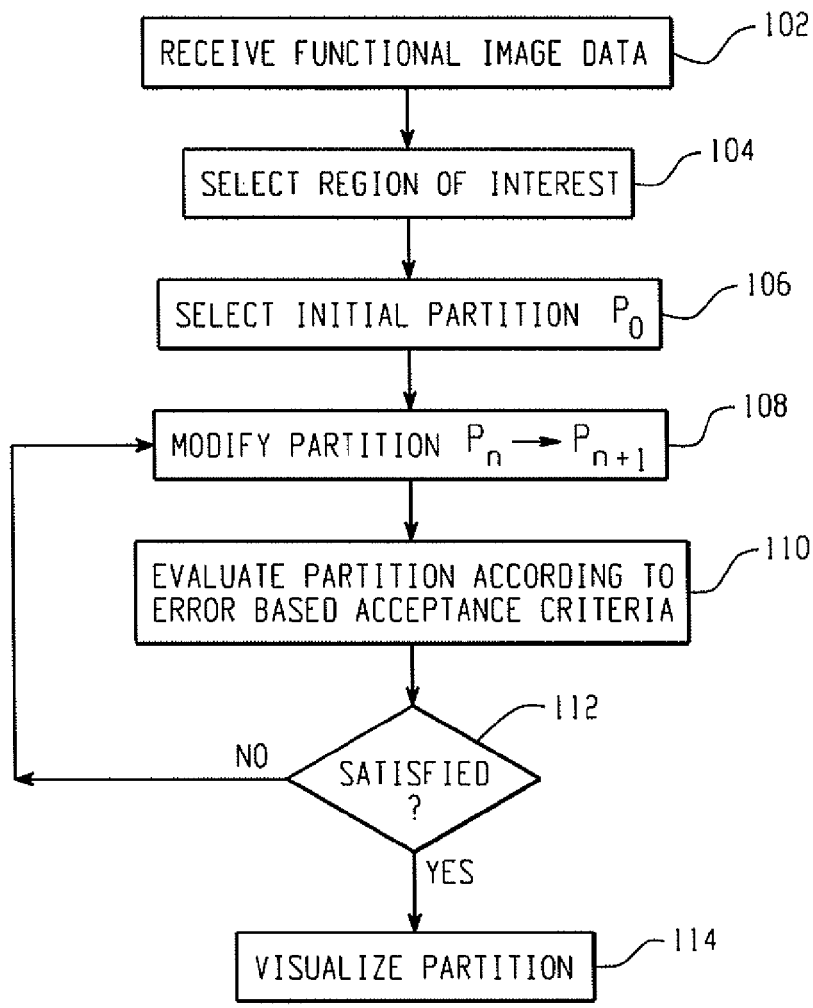

| | | | |
|---|---|---|---|
| 2004/0120564 A1* | 6/2004 | Gines | 382/131 |
| 2004/0120571 A1* | 6/2004 | Duvdevani et al. | 382/149 |
| 2004/0120580 A1* | 6/2004 | Sabol et al. | 382/224 |
| 2004/0171931 A1* | 9/2004 | Barth et al. | 600/425 |
| 2004/0208341 A1* | 10/2004 | Zhou et al. | 382/103 |
| 2004/0267114 A1 | 12/2004 | Mundy et al. | |
| 2006/0072797 A1* | 4/2006 | Weiner et al. | 382/128 |
| 2006/0215889 A1* | 9/2006 | Omi et al. | 382/128 |
| 2007/0009167 A1* | 1/2007 | Dance et al. | 382/254 |
| 2007/0014454 A1* | 1/2007 | Sawyer et al. | 382/128 |
| 2007/0092133 A1* | 4/2007 | Luo | 382/159 |

FOREIGN PATENT DOCUMENTS

| | | |
|---|---|---|
| EP | 1146478 A2 | 10/2001 |
| WO | 0178492 A2 | 10/2001 |
| WO | 2004068401 A2 | 8/2004 |
| WO | 2005059834 A1 | 6/2005 |

OTHER PUBLICATIONS

Haralick, R. M., et al.; Survey: Image Segmentation Techniques; 1985; Computer Vision, Graphics, and Image Processing; 29:100-132.

Martin, P., et al.; Influence of the Noise Model on Level Set Active Contour Segmentation; 2004; IEEE Trans. on Pattern Analysis and Machine Intelligence; 26(6)799-803.

Rosenberger, C., et al.; Unsupervised clustering method with optimal estimation of the number of clusters: Application to image segmentation; 2000; IEEE Pattern Recognition; 1:656-659.

Samsonov, A. A., et al.; Noise-adaptive Anisotropic Diffusion Filtering of MRI Images Reconstructed by SENSE (Sensitivity Encoding) Method; 2002; IEEE Biomedical Imaging; pp. 701-704.

Wong, K-P, et al.; Segmentation of Dynamic PET Images Using Cluster Analysis; 2002; IEEE Trans. on Nuclear Science; 49(1)200-207.

Zhang, B., k-Harmonic Means-A Data Clustering Algorithm; 1999; Hewlett-Packard Technical Report HPL-1999-124.

* cited by examiner

ERROR ADAPTIVE FUNCTIONAL IMAGING

CROSS REFERENCE TO RELATED APPLICATIONS

This application claims the benefit of U.S. provisional application Ser. No. 60/747,668 filed May 19, 2006, which is incorporated herein by reference.

The following relates primarily to functional medical imaging. It finds particular application to situations in which it is desirable to identify and account for uncertainty resulting from noise and other error sources in functional imaging information.

Medical imaging technologies have become critical tools in the diagnosis and treatment of disease. One aspect of medical imaging which has received considerable attention has been functional imaging, which provides information on functional parameters relevant to a diagnosis and/or treatment.

Functional imaging generally involves the generation of parametric maps of a parameter of interest. One example is the use of FMISO-PET images in oncologic studies, where a functional, hypoxia-related parameter is used to discriminate between more or less aggressive portions of a tumor. Another example includes cardiac PET or SPECT studies, where parametric maps of functional, perfusion-related parameters are used to identify hypoperfused regions of the myocardium. Yet other examples are functional magnetic resonance imaging (fMRI), which has been particularly useful for providing information relevant to brain function, and molecular imaging, which provides information about a molecular marker or agent.

One complicating factor, however, has been the effect of noise and other uncertainty. While voxel-wise parameter estimates provide a relatively higher spatial resolution, such estimates are particularly prone to the effects of noise in the underlying image data. Unless accounted for, the effects of such noise can lead to sub-optimal diagnosis or treatment.

Smoothing techniques have been used to reduce statistical parameter fluctuations arising from factors such as imaging noise, modeling noise, and data sparseness. One popular smoothing technique is clustering, in which a region or volume of interest is divided into contiguous or non-contiguous sub-regions having similar parameter values. A desired number of clusters is specified, and a clustering algorithm is used to divide the region into the specified number of clusters. The so-defined regions are in turn used for diagnosis (e.g., determining the size of tumor or an ischemic region in the myocardium) and/or therapy (e.g., determining radiation dose in radiation therapy planning).

One drawback to the foregoing technique, however, is that the number and/or distribution of the clusters may be inappropriate, leading to sub-optimal clustering. The sub-optimal clustering may in turn lead to a sub-optimal diagnosis and/or treatment.

Accordingly, it is desirable to provide improved techniques for accounting for the effects of noise and other uncertainty in functional imaging.

Aspects of the present invention address these matters, and others.

According to a first aspect of the present invention, a method includes receiving functional image data indicative of a region of interest of an object, where the functional image data includes a spatially varying functional parameter value and a spatially varying functional error model. The method also includes partitioning the region of interest as a function of the spatially varying error model and generating an image indicative of the partitioned region of interest.

According to another aspect of the present invention, an apparatus includes means for receiving functional image data indicative of a region of interest of an object, where the functional image data includes a spatially varying functional parameter value and a spatially varying functional error model. The method also includes means for partitioning the region of interest as a function of the spatially varying error value, and means for generating an image indicative of the partitioned region of interest.

According to another aspect of the invention, a computer readable storage medium contains instructions which, when executed by a computer, cause the computer to carry out a method which includes receiving functional image data indicative of a region of interest of an object and clustering the functional image data into a plurality of clusters. The functional image data includes functional values and functional error model. The number of clusters is a function of a functional error model of functional values included in a cluster.

According to another aspect of the invention, a computer readable storage medium contains instructions which, when executed by a computer, cause the computer to carry out a method which includes receiving functional image data indicative of a region of interest of an object, using the spatially varying functional error model to spatially vary a spatial resolution of the functional image data, and generating an image indicative of the functional image data.

According to another aspect of the invention, a method includes receiving functional image data indicative of a region of interest, displaying the functional image data in a human readable form on a GUI, and interactively partitioning the region of interest based on the functional error model and a human assessment of the displayed functional image data.

Those skilled in the art will appreciate still other aspects of the present invention upon reading and understanding the attached figures and description.

The present invention is illustrated by way of example and not limitation in the figures of the accompanying drawings, in which like references indicate similar elements and in which:

FIG. 1 depicts steps in partitioning an image volume.

FIGS. 2A, 2B, 2C, and 2D depict an image volume at various stages of a dyadic partitioning.

Figure 3:
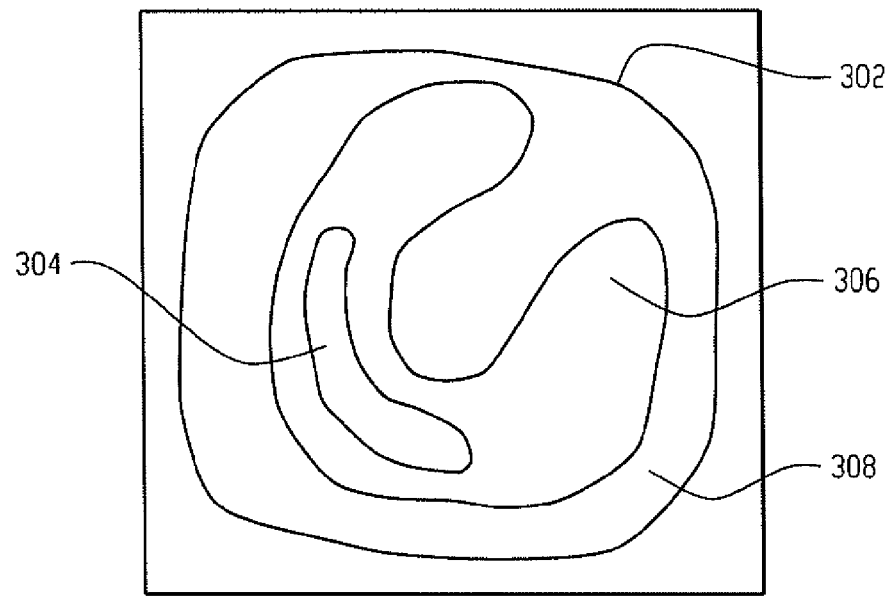

FIG. 3 depicts a plurality of clusters.

Parameter maps and functional information derived from practical imaging procedures such as PET, SPECT, or fMRI can have substantial error or uncertainty due to the noise in the underlying image data. The noise of a functional parameter value is generally related to the size of the region over which it is estimated. Voxel-wise estimates show the highest level of spatial resolution but generally have large uncertainty or confidence intervals in the displayed values. While reducing the spatial resolution tends to reduce the uncertainty and hence narrow the confidence intervals, spatial detail can be lost.

These effects can be ameliorated by adaptively varying the spatial resolution of a parameter estimate over an image volume or other region of interest as a function of the error. The spatial resolution may be varied according to a desired error optimization criteria, for example to achieve a desired error or a desired error distribution over the region of interest. Doing so may in many cases improve the visualization of the data, or otherwise provide information which is useful for diagnosis or treatment.

Clustering techniques can also be affected by the errors or uncertainty in the underlying functional data, especially where the number of clusters is established a priori. For example, prior specification of the number of clusters may lead to clustering results for which the average value of the functional parameter for two or more clusters may have statistically insignificant deviations. Consequently, the separation between two or more of the clusters may not be physiologically and/or statistically meaningful. On the other hand, the characteristics of the data may be such that additional, meaningful clusters may be established.

These effects can be ameliorated by incorporating an error measure as part of the clustering procedure and using this measure to adaptively adjust the number of clusters as a function of the error. For example, the error may be used to assess the significance of a cluster separation and to adjust the number of clusters accordingly. Doing so may in many cases improve the cluster separation, thus improving the visualization of the data or otherwise providing information which is useful for diagnosis or treatment.

An exemplary, iterative procedure for partitioning a volume or other region of interest as a function of the error is shown in FIG. 1.

Functional imaging data such as a parameter map is received at step 102. The functional image data typically includes a spatially varying functional parameter value f(x,y,z) and an associated spatially varying error model e(x,y,z) which vary over an image volume.

Where the region of interest is a subset of the image volume, an optional region of interest selection step is performed at 104. The region of interest may be selected by the operator, for example by displaying the volume in a human readable form and requesting that the user specify the desired region. The region of interest may also be determined via segmentation or other image processing techniques, either alone or in conjunction with operator input.

An initial partition $P_0$ of the region of interest is selected at 106. More particularly, the region of interest is divided into one or more sub-regions. In one implementation, the sub-regions are established spatially, for example by performing a dyadic partition of the data set. In another implementation, the sub-regions are established using a clustering or region growing technique.

At step 108, the then-current partition $P_n$ is modified according to an error-based partitioning strategy to generate a new partition $P_{n+1}$.

The new partition is evaluated according to an error-based acceptance criterion at step 110. In one implementation, the partitioning is conducted so that the error estimates of the various sub-regions are minimized or otherwise less then a desired threshold value. In another variation, partitioning is conducted so that the various sub-regions have a desired error homogeneity, for example so that the difference between the error values in the various sub-regions is minimized or otherwise less than a desired threshold value (or stated another way, so that the error homogeneity is maximized).

The optimization strategy and acceptance criteria may also consider functional parameters, with the partitioning conducted accordingly. As one example, the acceptance criteria may also consider both the variation in the voxel values and the functional parameter error estimates either in a particular sub-region or across multiple sub-regions.

At 112, if the acceptance criterion is not satisfied, processing is returned to step 108, where the volume or region of interest is re-partitioned. If the acceptance criterion is satisfied, the partition is accepted.

The proposed partition may optionally be presented to the operator for acceptance. Depending on the implementation, the operator may reject the proposed partition, in which case the previous partition is accepted. Alternately, the operator may elect to accept the new partition, even though the acceptance criteria may not be satisfied. The operator may also be given the option to manually modify the partition.

A proposed partition may be presented to the operator in various ways. For example, a sub-region to be operated on may be highlighted by color coding, by blinking, interleaved visualizations, or other graphic techniques using a graphical user interface (GUI). Alternately or additionally, information such as histograms, numerical displays of parameter and/or error values, and text messages may also be presented.

The accepted partition is visualized at step 114, for example by displaying the parameter map in human readable form on a computer display or monitor. Alternately or additionally, the data may be used as in input to a computer assisted diagnosis program or therapy planning procedure in order to assist in a diagnosis or in planning a course of treatment.

An exemplary partitioning in which a spatial resolution of a region of interest is varied as a function of the error will now be described. P denotes a complete partitioning of a volume or region of interest that is a set of p voxel sets S:

$$P=\{S1,\ldots,S_P\} \quad \text{Equation 1}$$

$$Si=\{(x1,y1,z1),\ldots,(x_{Ni},y_{Ni},z_{Ni})\}, i=1,\ldots,P \quad \text{Equation 2}$$

Each voxel set Si defines a region consisting of Ni voxels on which the functional parameter f(Si) and its error e(Si) can be computed:

$$\{f(S),e(S)\}=F(S) \quad \text{Equation 3}$$

where F represents the parameter estimation procedure with the estimated functional parameter value f and the associated functional error model e as generated by the functional imaging model.

The error in the parameter values can be reduced by averaging over a larger region. The smallest possible region is a single voxel, whereas the largest possible region is the whole volume. The volume is partitioned so that the error on the parameter values fulfills the desired acceptance criteria.

As discussed above, various optimization strategies and acceptance criteria are contemplated. For example, the volume may be partitioned according to a functional error minimization strategy so that the functional error in each sub-region is less than a maximum error threshold:

$$e(S_i) \leq e_{max}, i=1,\ldots,P \quad \text{Equation 4}$$

If the error is small enough, the spatial resolution is not reduced further.

Another approach is minimum error:

$$e(S_i) \rightarrow \min, i=1,\ldots,P \quad \text{Equation 5}$$

Spatial resolution is always traded for error minimization.

Another approach focuses on error homogeneity among the sub-regions so that the functional error variation among two or more sub-regions is minimized. For example, the volume may be partitioned so that the error variation is less then a threshold value:

$$\frac{1}{P}\sum_{i=1}^{P} e^2(S_i) - \left(\frac{1}{P}\sum_{i=1}^{P} e(S_i)\right)^2 \leq e_{thresh} \quad \text{Equation 6}$$

where $e_{thresh}$ is the maximum variation. The functional error variation may also be minimized:

$$\frac{1}{P}\sum_{i=1}^{P}e^2(S_i) - \left(\frac{1}{P}\sum_{i=1}^{P}e(S_i)\right)^2 \to \min \qquad \text{Equation 7}$$

The latter techniques trade spatial resolution for error homogeneity.

Note that the above discussion has focused on optimizing over the entire volume. The optimization may also be restricted to a region or other sub-volume of interest. Different acceptance criteria may also be established for different portions of the volume or region. The thresholds may also be established as a function of the functional parameter values f.

Figure 2A:
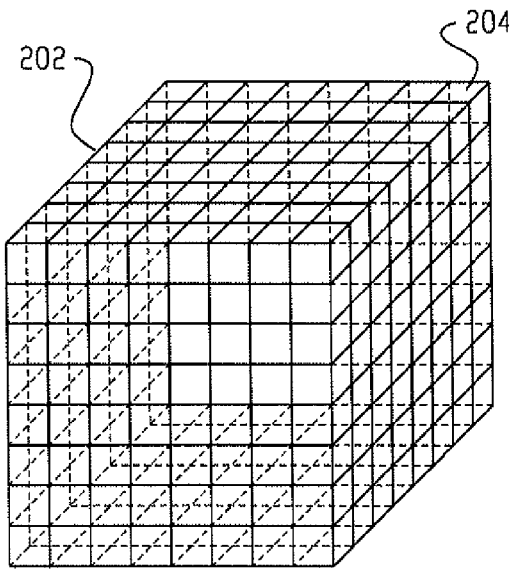
Figure 2B:
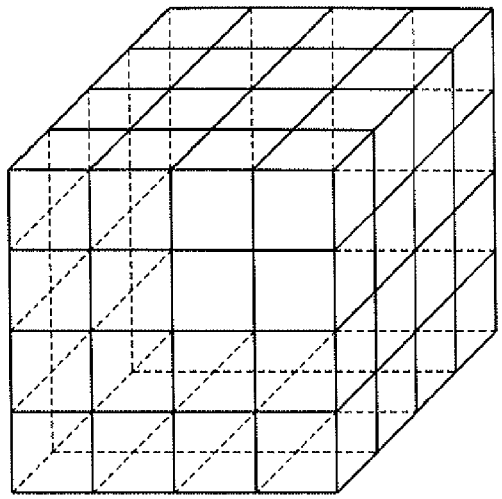
Figure 2C:
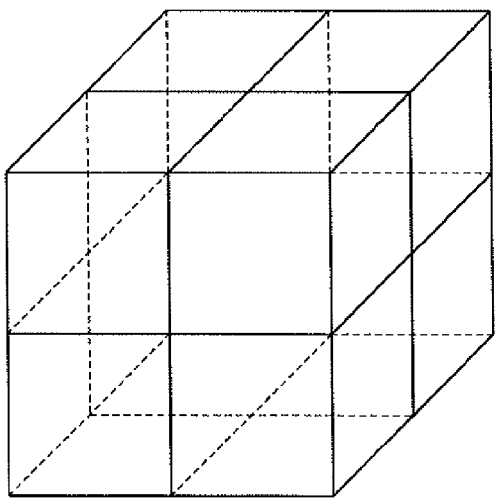

An exemplary dyadic partitioning strategy will now be described with reference to FIG. 2. The initial volume 202 is shown at FIG. 2A. The volume 202 includes a plurality of voxels 204 each having a functional parameter value f and a functional error model e. FIGS. 2B and 2C depict a second and third level dyadic decomposition of the volume into sub-regions regions of relatively coarser spatial resolution, respectively. Where the objective is to vary the resolution as a function of the error distribution, the functional parameter values f are advantageously calculated at each resolution level. While a three level decomposition is shown for ease of illustration, greater (e.g., four or more) or fewer levels may also be implemented.

The coarsest resolution (i.e., that of FIG. 2C in the present example) is selected. Here the partition may be tested against the acceptance criteria to determine if it has already been satisfied. The partitions are modified by decomposing each sub-region that is not already at the highest resolution level (i.e., that of FIG. 2A in the present example) to a higher resolution. The proposed modification is tested to determine whether it advances progress toward the acceptance criteria. Once the acceptance criteria has been satisfied for all sub-regions (or if no further partitions are proposed), the current partition is accepted and the process is terminated.

Figure 2D:
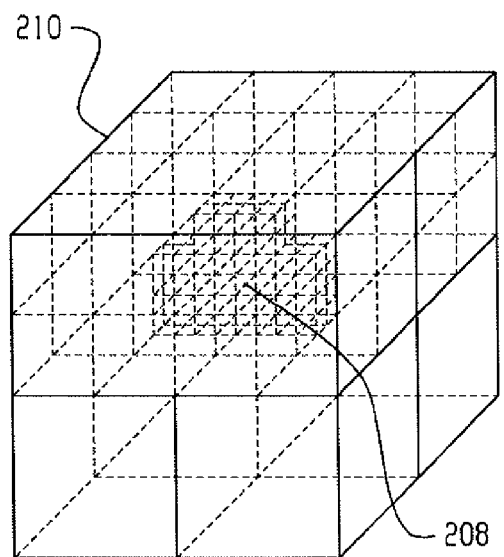

An exemplary final decomposition is shown in FIG. 2D. As illustrated, the bottom portion 206 of the volume has a relatively low resolution, the center portion 208 of the volume has a relatively high resolution, and the remainder of the upper portion 210 has an intermediate resolution. As can be seen, the volume exhibits a spatially varying spatial resolution.

As discussed above, the partitioning may be performed interactively through a GUI or otherwise so that the user has the opportunity to accept, reject, or otherwise modify a proposed partition. It may also be helpful to maintain a history (or a partial history) of the partitioning process. The history may then serve as a quick partition change in the interactive scenario. The history may also be used to provide portioning based on previous decisions, for example for use in adaptive radiation therapy treatments (i.e., repeat imaging). While the above example discussed a dyadic partitioning strategy, clustering, region growing, or non-dyadic strategies may be employed.

An exemplary partitioning strategy which uses clustering to vary the number of clusters as a function of both the error model e and the statistical error s will now be described in relation to FIG. 3. In the following, the error of the functional parameter x in voxel i is denoted as $e_i$. The value of the functional parameter x in voxel i is thus $(x_i \pm e_i)$.

Partitioning may be performed using k-means or other known clustering algorithms. The k-means algorithm can be represented as follows:

```
Begin initialize: n, NC, μ₁, μ₂, ..., μ_c
    Do classify n samples according to nearest μ_i
    recompute μ_i
    Until no change in μ_i
    Return μ₁, μ₂, ..., μ_c
End
``` where n is the sample size, NC is a pre-defined number of clusters, and $\mu_e$ are the values of the cluster centers. Other clustering techniques, for example the known K-Harmonic Means Algorithm (which is relatively less sensitive to the initial conditions) or the known Genetic Clustering Algorithm (which establishes the number of clusters NC based on the parameter values f) may also be used.

The classification of a sample $x_i$ according to the nearest cluster center $c_j$ is performed using a suitable distance measure d, where l represents the vector components of the data:

$$d(x_i, c_j) = \sum_l w_l |x_{i,l} - c_{j,l}|^\rho \qquad \text{Equation 8}$$

with ρ a weighting exponent to adjust the distance measure, e.g. ρ=1: city-block (L1), ρ=2: Euclid (L2). The weights $w_k$ can further refine the measure and may reflect the frame duration in case of dynamic data.

As shown in FIG. 3, an exemplary clustering of a region of interest 302 might yield first 304, second 306, and third 308 clusters. The functional parameter value (calculated as the mean, average, other function of the voxels in the cluster) of the cluster centers may be represented as $304_e$, $306_e$ and $308_e$ and the error of the functional values by $e304_e$, $e306_e$ and $e308_e$. If, for example, the parameter value of the second cluster 306 falls within the error limits of the third cluster 308:

$$308_e - e308_e < 306_e < 308_e + e308_e \qquad \text{Equation (9)}$$

then it is generally undesirable to distinguish the second 306 and third 308 clusters for the purposes of diagnosis or treatment, and fewer clusters should be provided (i.e., clusters should be merged). If, on the other hand, the statistical and physiological characteristics of the data are such that the further separation of one or more of the clusters would provide additional information relevant to the diagnosis or treatment, then more clusters should be assigned.

The statistical error s of the parameter values x in cluster k may be expressed as the standard deviation of the voxel values x belonging to cluster k;

$$s_k = \sqrt{\frac{1}{N_k - 1} \sum_{x_i \in k} (x_i - c_k)^2} \qquad \text{Equation 10}$$

where $s_k$ is the standard deviation, $c_k$ is the cluster center, and $N_k$ is the number of voxel or elements in cluster k Note that the distribution of the parameter x may also be expressed as the average, median or other function.

In the present example, the functional error model e and the statistical error s are both used to assess the cluster separation and to adjust the number of clusters, and a merging/splitting strategy is used to vary the number of clusters. The pseudo-code of an exemplary top-level merging/splitting strategy can be expressed as follows:

```
    FOR j = 1 TO NC
        FOR i = 1 TO NC
            IF i != j AND functional value (μ_i−e_i) < μ_j < (μ_i+e_i) THEN
                merge cluster
i and j
            IF s_j > α · e_j THEN split cluster j
UNTIL no more cluster allocation changes
``` where $\alpha$ is an empirically determined constant. As noted above, the merging and splitting operations may be done automatically or be confirmed by user interaction.

An exemplary merging of clusters will now be described in greater detail. If, for example, the functional value $\mu_j$ of cluster j falls within the error bars $(\mu_i-e_i)$ of cluster i, then the algorithm will propose the merging of clusters i and j. One implementation is as follows:

```
Begin initialize: n, NC, μ_1, μ_2, ..., μ_c
    Do k-means or other clustering, yielding cluster centers
        μ_1', μ_2', ..., μ_c0'
        if for any two clusters i and j μ_i' − e_i' < μ_j' < μ_i' + e_i',
            then propose to merge clusters i and j
        if user accepts, then set NC → NC−1 and calculate mean of
            clusters i
and j
        redo clustering
        Until cluster centers are distinct in terms of error model e
    Return estimated cluster centers
End
```

Alternative criteria, involving the statistical distribution s, are also contemplated.

In the example of FIG. 3, the clustering procedure arrived at three clusters 304, 306, 308. If the functional values within the first 304 and second 306 cannot be distinguished in terms of the functional error model e, the two clusters are merged. The cluster procedure is then re-run with the number of clusters decremented.

An exemplary splitting of clusters will now be described in greater detail. If the statistical error $s_k$ of cluster k is larger than the functional error $e_k$, then the algorithm may suggest to split cluster k:

```
Begin initialize: n, NC, μ_1, μ_2, ..., μ_NC
    Do k-means or other clustering, yielding cluster centers
        μ_1', μ_2', ...,
μ_c0'
            if for any clusters k: e_k < c · s_k and N_k > Θ, then
            propose to split
            clusters k
            if user accepts, then set NC → NC+1 and (μ_k=μ_k'−ε,
            μ_{k+1}=μ_k'+ε
        redo k-means clustering algorithm
        Until no further splitting
    Return estimated cluster centers
End
```

In the above, c and $\Theta$ are empirically determined constants and $\epsilon$ is a small perturbation vector. Note that merging and splitting of clusters can be combined, if appropriate.

In the example of FIG. 3, if the statistical error of the first cluster 304 is large compared to the functional error model e, then the number of clusters is incremented and the clustering procedure is re-run with the first cluster 304 split into two clusters.

As discussed above, a proposed merging or splitting of the clusters may be presented to the operator for acceptance. Thus, the clusters may be highlighted by way of color coding, interleaved cluster visualization, blinking, text messages, or the like. Statistical data such as histograms, functional values $\mu_i$ and/or the functional errors $e_i$ for one or more of the clusters may also be presented. The user may then decide to accept or reject the proposed new partition, run the cluster algorithm with the adjusted number of clusters, or accept the result and terminate the process.

The techniques described above well-suited for use with data generated by PET, SPECT, fMRI, functional CT, or other scanners which can provide functional information. The techniques are also well-suited for use with data generated using molecular imaging which provide information on other functional characteristics, such as glucose consumption (e.g. FDG PET), cell proliferation (e.g. FLT PET), apoptosis (egg. Annexin-V), and receptor density (in the brain or elsewhere).

In radiation therapy or other applications where anatomic localization is important, the patient may also be scanned with an MRI, computed tomography (CT), ultrasound (US), x-ray, or other scanner, and the functional and anatomic data are co-registered. In some cases (e.g., in the case of MR and FMRI), the functional and anatomical information may be obtained in a single scanning procedure. The use of hybrid scanners such as hybrid PET/MR, PET/CT, SPECT/CT, or other hybrid modalities is also contemplated.

Data from the functional imaging modality is modeled using an appropriate physical model to generate one or more parametric maps, and the data is manipulated as described above. The resultant data may be used by a physician or user connection with a diagnosis or planning a course of treatment. The resultant data may also be used as an input to a treatment planning system in. In the exemplary case of a radiation therapy planning (RTP) package, the data is used to plan a radiation dose, for example by providing a relatively higher radiation dose to relatively more radiation resistant portions of a tumor.

Embodiments of the invention described above may be tangibly embodied in a computer program stored in suitable computer readable storage medium. The computer program comprises instructions which, when read and executed by a processor causes the processor to perform the steps necessary to execute the steps or elements of the present invention. Exemplary machine-readable memory storage media include, but are not limited to, fixed hard drives, optical discs, magnetic tapes, semiconductor memories, such as read-only memories (ROMs), random access memory (RAM) and programmable (PROMs). The memory containing the computer readable code is utilized by executing the code directly from the memory, or by copying the code from one memory storage device to another memory storage device, or by transmitting the code on a network for remote execution.

Of course, modifications and alterations will occur to others upon reading and understanding the preceding description. It is intended that the invention be construed as including all such modifications and alterations insofar as they come within the scope of the appended claims or the equivalents thereof.

The invention claimed is:

1. A method comprising:
   receiving functional image data indicative of a region of interest of an object, the functional image data including a spatially varying functional parameter value (f) and a spatially varying functional error model (e);
   partitioning the region of interest as a function of the spatially varying error model;
   generating an image indicative of the partitioned region of interest.

2. The method of claim 1 wherein partitioning includes partitioning the region of interest into sub-regions having differing spatial resolutions.

3. The method of claim 2 wherein partitioning includes partitioning the region of interest according to a functional error model homogeneity criterion.

4. The method of claim 2 wherein partitioning includes partitioning the region of interest according to a functional error model minimization criterion.

5. The method of claim 1 wherein partitioning includes partitioning the region of interest into a first plurality of clusters having similar functional parameter values, and wherein the number of clusters is a function of the error model and a statistical error.

6. The method of claim 1 wherein partitioning includes
partitioning the region of interest into a first number of clusters;
using the error model to assess a separation of the clusters;
partitioning the region of interest of a second number of clusters.

7. The method of claim 6 wherein using the error model includes using the error model and a statistical error to assess a separation of the clusters.

8. The method of claim 7 wherein partitioning the region of interest into a second number of clusters includes at least one of splitting a cluster and merging a first cluster and a second cluster.

9. The method of claim 6 including
displaying a proposed partitioning in a human readable form;
allowing a user to reject the proposed partitioning.

10. The method of claim 9 includes highlighting a proposed partitioning using a GUI.

11. The method of claim 1 wherein the functional parameter is indicative of hypoxia.

12. The method of claim 1 wherein the method includes using the partitioned region of interest to calculate a radiation dose distribution.

13. The method of claim 1 wherein the functional parameter is indicative of perfusion.

14. The method of claim 1 wherein the image is indicative of a molecular imaging agent.

15. The method of claim 1 wherein the functional parameter is indicative of glucose consumption, cell proliferation, apoptosis, or receptor density.

16. An apparatus comprising:
means for receiving functional image data indicative of a region of interest of an object, the functional image data including a spatially varying functional parameter value (f) and a spatially varying functional error model (e);
means for partitioning the region of interest as a function of the spatially varying error value;
means for generating an image indicative of the partitioned region of interest.

17. The apparatus of claim 16 including means for generating the functional image data.

18. The apparatus of claim 16 wherein the means for partitioning includes GUI means for interactively partitioning the region of interest as a function of the spatially varying error model and a human input.

19. A computer readable storage medium containing instructions which, when executed by a computer, cause the computer to carry out a method comprising:
receiving functional image data indicative of a region of interest of an object, wherein the functional image data includes functional values (f) and a spatially varying error model;
clustering the functional image data into a plurality of clusters, wherein the number of clusters is a function of a functional error model of functional values included in a cluster.

20. The computer readable storage medium of claim 19 wherein the number of clusters is a function of a statistical error (s).

21. The computer readable storage medium of claim 19 wherein the number of clusters is a function of a functional error model (e).

22. The computer readable storage medium of claim 19 wherein the method includes:
clustering the functional data into a first number of clusters;
using the error model to assess the clusters;
adjusting the number of clusters according to a result of the assessment;
clustering the functional data into a second number of clusters.

23. The computer readable storage medium of claim 22, wherein a cluster includes a statistical error and a functional error model, and wherein the method includes:
comparing a measure of the statistical error and a measure of the functional error model;
if the measure of the parameter distribution exceeds the measure of the physiological error distribution, increasing the number of clusters.

24. The computer readable storage medium of claim 23 wherein the method includes splitting the cluster.

25. The computer readable storage medium of claim 23 wherein the measure of the statistical error is a standard deviation.

26. The computer readable storage medium of claim 19 wherein a first cluster includes a parameter value and second cluster includes an error distribution, and wherein the method includes:
determining whether the parameter value lies within the error distribution; if the parameter value lies within the error distribution, then decreasing the number of clusters.

27. The computer readable storage medium of claim 26 wherein the method includes merging the first and second clusters.

28. The computer readable storage medium of claim 19 wherein the method includes
displaying a proposed clustering of the data in human readable form;
allowing a user to accept or reject the proposed clustering.

29. The computer readable storage medium of claim 19 wherein the method includes using the clustered data to calculate a radiation dose.

30. The computer readable storage medium of claim 19 wherein the region of interest is the brain and the clusters are indicative of a brain function.

31. A computer readable storage medium containing instructions which, when executed by a computer, cause the computer to carry out a method comprising:
receiving functional image data indicative of a region of interest of an object, the functional image data including a spatially varying functional parameter value (f) and a spatially varying functional error model (e);
using the spatially varying functional error model to spatially vary a spatial resolution of the functional image data;
generating an image indicative of the functional image data.

32. The computer readable storage medium of claim 31, wherein the method includes varying the spatial resolution according to one of a functional error model homogeneity criteria and a functional error model minimization criteria.

33. The computer readable storage medium of claim 31, wherein the region of interest includes the myocardium and the functional parameter is indicative of ischemia.

34. The computer readable storage medium of claim 31, wherein the image includes at least two sub-regions with different spatial resolutions based on the functional error model.

35. A method comprising:
receiving functional image data indicative of a region of interest, the functional image data including a functional parameter value (f) and a spatially varying functional error model (e);
displaying the functional image data in a human readable form on a GUI;
interactively partitioning the region of interest based on the spatially varying functional error model and a human assessment of the displayed functional image data.

36. The method of claim 35 including repeating the steps of displaying and interactively partitioning the region of interest a plurality of times.

37. The method of claim 35 including receiving a human input accepting a proposed partition of the volume of interest.

38. The method of claim 35 including receiving a human input proposing a partition of the volume of interest.

39. The method of claim 35 wherein interactively partitioning the volume of interest includes interactively partitioning the volume of interest into a plurality of sub-regions, wherein the number of sub-regions is based on the functional error model and the human assessment.

40. The method of claim 35 wherein the functional parameter is indicative of hypoxia or perfusion.

\* \* \* \* \*